(12) United States Patent
Diorio

(10) Patent No.: US 9,033,160 B1
(45) Date of Patent: May 19, 2015

(54) BICYCLE STAND AND METHOD OF USE

(71) Applicant: Scorpion Bike Stands, LLC, Dana Point, CA (US)

(72) Inventor: Mike Diorio, Winchester, CA (US)

(73) Assignee: Scorpion Bike Stands, LLC, Dana Point, CA (US)

( * ) Notice: Subject to any disclaimer, the term of this patent is extended or adjusted under 35 U.S.C. 154(b) by 0 days.

(21) Appl. No.: 14/199,795

(22) Filed: Mar. 6, 2014

Related U.S. Application Data

(60) Provisional application No. 61/900,069, filed on Nov. 5, 2013.

(51) Int. Cl.
*B62H 1/08* (2006.01)
*B62H 3/10* (2006.01)
*B62H 5/10* (2006.01)

(52) U.S. Cl.
CPC .. *B62H 1/08* (2013.01); *B62H 3/10* (2013.01); *B62H 5/10* (2013.01)

(58) Field of Classification Search
CPC ...... B25H 1/0007; B25H 1/0014; B25H 3/00; B25H 3/10; B62H 1/08; B62H 5/10
USPC ............... 211/5, 17, 18, 19, 20, 21, 22, 41.4, 211/85.31, 133.1, 133.2, 133.4, 133.5, 211/181.1, 196, 205; 280/288.4, 293; 482/61; 248/107, 153, 158, 175, 465.1; D6/317, 537, 654.11, 654.18, 655.11, D6/655.18, 656.12, 656.13, 675.2, 675.5, D6/676.5, 678.4, 680.3, 681, 681.1, D6/688.15, 691.6, 692.4, 696.1, 696.3, D6/697.1, 709.2; D8/370; D12/115
See application file for complete search history.

(56) References Cited

U.S. PATENT DOCUMENTS

| | | | | | |
|---|---|---|---|---|---|
| 468,920 | A | * | 2/1892 | Ross | 211/22 |
| 598,791 | A | * | 2/1898 | Leavitt | 211/22 |
| D229,378 | S | * | 11/1973 | Johnson | D6/462 |
| D239,072 | S | * | 3/1976 | Adams | D6/410 |
| 3,980,320 | A | * | 9/1976 | Marchello | 280/293 |
| 4,979,759 | A | * | 12/1990 | Solovay | 280/293 |
| 5,497,967 | A | * | 3/1996 | Gantois | 248/166 |
| 5,498,015 | A | * | 3/1996 | Trout et al. | 280/293 |
| 6,273,392 | B1 | * | 8/2001 | Birkhold | 248/622 |
| 6,371,309 | B1 | * | 4/2002 | Smith | 211/22 |
| 6,908,060 | B2 | * | 6/2005 | Hibbs | 242/578.2 |
| 7,789,410 | B1 | * | 9/2010 | White | 280/293 |
| 2009/0256123 | A1 | * | 10/2009 | Heck | 254/131 |
| 2014/0035267 | A1 | * | 2/2014 | Moore | 280/766.1 |

FOREIGN PATENT DOCUMENTS

GB 446974 * 11/1934 ............... B62H 3/00

OTHER PUBLICATIONS http://andystand.co.uk/shop, "Products | Andy Stands", Published on Oct. 3, 2012 and accesed via the Wayback Machine on Aug. 1, 2014.*

* cited by examiner

*Primary Examiner* — Joshua Rodden
(74) *Attorney, Agent, or Firm* — Karich & Associates; Eric Karich

(57) ABSTRACT

A bicycle stand has a base, an upright support structure extending upwardly from the base to a top end, and a spindle engaging post that extends outwardly from the top end of the upright support structure, for engaging a spindle of a bicycle so that the bicycle stand supports the bicycle in an upright position on a surface.

11 Claims, 4 Drawing Sheets

BICYCLE STAND AND METHOD OF USE

CROSS-REFERENCE TO RELATED APPLICATIONS

This application for a utility patent claims the benefit of U.S. Provisional Application No. 61/900,069, filed Nov. 5, 2013.

BACKGROUND OF THE INVENTION

1. Field of the Invention

This invention relates generally to stands for holding a piece of equipment, and more particularly to stands for holding a bicycle upright.

2. Description of Related Art

It is often desired by users of bicycles to hold their bicycles upright and stable when not in use. Many bicycles, particularly higher-end bicycles, racing bicycles, and special purpose bicycles may not come with kickstands for holding the bicycle upright. Also, for bicycles with kickstands, often they do not support the bicycle adequately and tend to allow the bicycle to fall over, particularly if parked on uneven or soft terrain. Other bicycle stands are used by lifting the front wheel of the bicycle over a horizontal post, and resting it between a pair of supports or simply across the horizontal post itself. This may cause scratching or other unwanted contact between the bicycle and the stand. The present invention seeks to provide an means for holding a bicycle upright without any of the unwanted features as present in the prior art.

SUMMARY OF THE INVENTION

The present invention teaches certain benefits in construction and use which give rise to the objectives described below.

The present invention provides a bicycle stand and method for supporting a bicycle in an upright position on a surface by engaging a spindle of the bicycle. The bicycle stand has a base for supporting the bicycle stand on the surface, an upright support structure extending upwardly from the base to a top end, and a spindle engaging post that extends outwardly from the top end of the upright support structure for engaging the spindle of the bicycle so that the bicycle stand supports the bicycle in the upright position on the surface.

A primary objective of the present invention is to provide a bicycle stand having advantages not taught by the prior art.

Another objective is to provide a bicycle stand that supports a bicycle by engaging a spindle of a bicycle crank-arm.

A further objective is to provide a bicycle stand that provides a stable support for a bicycle that is quick and easy to use.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a bicycle stand 10 for holding a bicycle 12 upright on a surface 14.

Figure 1:
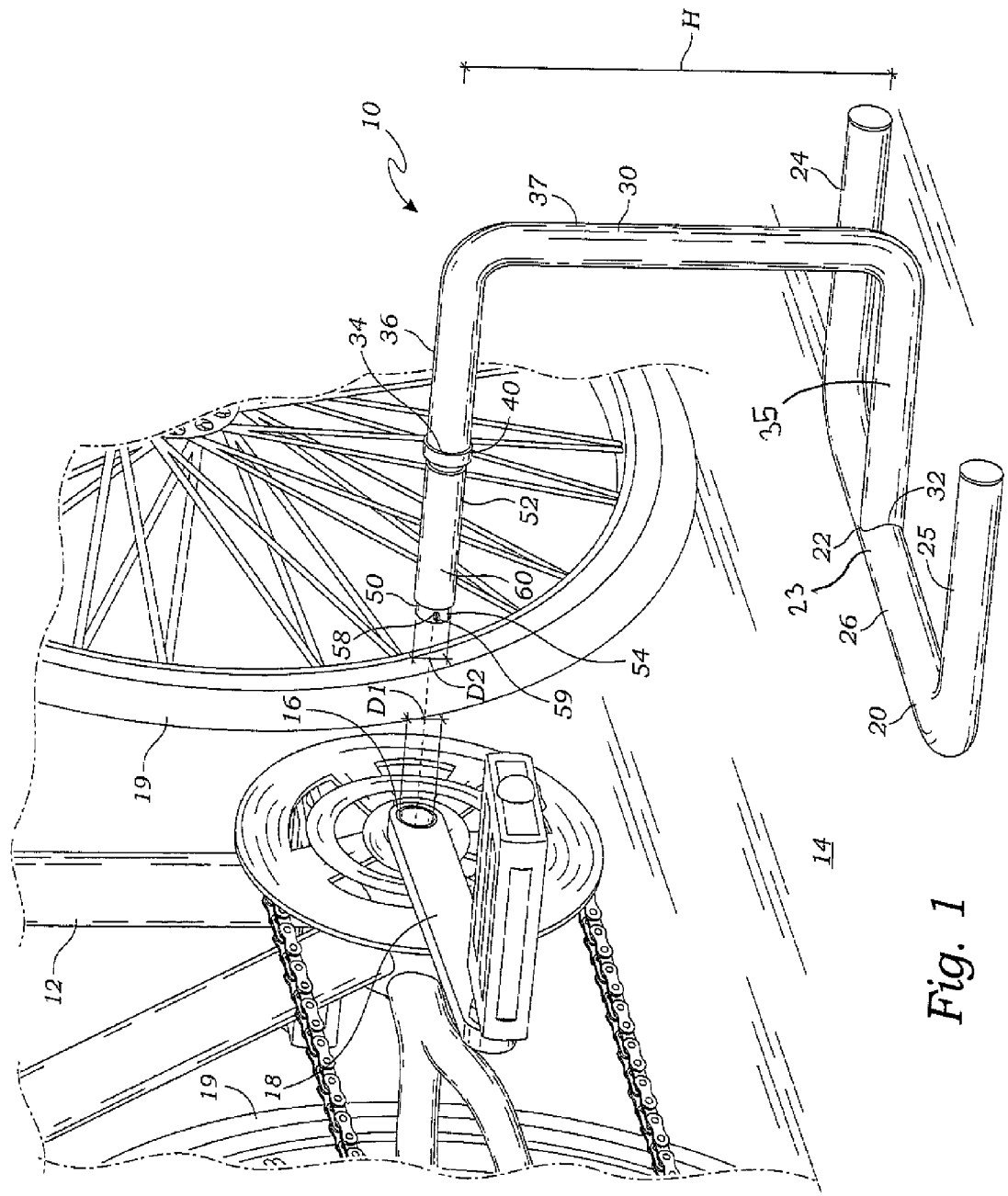
FIG. 1 is a perspective view of a bicycle stand of the present invention, illustrating a bicycle being mounted onto the bicycle stand by engaging a spindle engaging post of the bicycle stand with a spindle in a crank-arm of the bicycle.

FIG. 1 is a perspective view of a bicycle stand 10, illustrating a bicycle 12 with two wheels 19, being mounted onto the bicycle stand 10 by engaging a spindle engaging post 50 of the bicycle stand with a spindle 16 in a crank-arm 18 of the bicycle 12. The bicycle stand 10 supports the bicycle 12 in an upright position on the surface 14 once so engaged. As illustrated in FIG. 1, the bicycle stand 10 includes a base 20 for supporting the bicycle stand 10 on the surface 1 an upright support structure 30 that extends upwardly from the base 20 to position a spindle engaging post 50 for engaging the spindle 16 of the bicycle 12.

As illustrated in FIG. 1, the base 20 of the bicycle stand 10 may be of any shape or configuration that provides adequate stability to the bicycle stand 10 for supporting the bicycle 12. In the present embodiment, the base 20 has a first arm 24, a second arm 25, and a connecting arm 26. The connecting arm 26 is connected to the first arm 24 and the second arm 25, at approximately right angles, to form a generally "U-shaped" base 20. The angle and manner of connection of the first arm 24 and the second arm 25 to the connecting arm 26 may be varied according to one skilled in the art. In other embodiments the number of arms may be varied, for example a second connecting arm may be added to form a base 20 which is generally square in shape. Another embodiment may have only two arms, wherein the base 20 forms a "V-shape". Yet another embodiment may have only one arm, which may form a "T-shape" when connected to the upright support structure 30, or the single arm being bent around to join the ends, forming a circular or elliptical base.

The base 20 may have one or more connection points 22 where the base 20 may be connected to the upright support structure 30 for holding it in a generally vertical position. In the present embodiment, the connection point 22, where the upright support structure 30 is connected to the base 20, is in a middle 23 of the U-shaped base 20, which provides a stable foundation for supporting the bicycle 12. In alternate embodiments, there may be additional connection points for the upright support structure 30 to be connected to the base 20. The base 20 may also be of tubular construction, with cross-sectional shapes that may be circular, square, hexagonal, etc., with wall thicknesses that may be varied to meet manufacturing needs or structural strength, according to those skilled in the art. The base 20 (and the upright support structure 30 and the spindle engaging post 50) may be shaped such that when the bicycle 12 is mounted upon the spindle engaging post 50, that the center of gravity of the bicycle 12 is within an area between the front wheel 19 of the bicycle 12, the rear wheel 19 of the bicycle 12, and a point that is on the base 20. In this way, the net torque provided to the combination of the bicycle stand 10 and bicycle will be zero. As such, the base 20 is unable to pivot in any location resulting in the bicycle stand 10 falling over with the bicycle 12 attached. While FIG. 1 illustrates one embodiment of the base 20, those skilled in the art may devise alternative embodiments, and these alternative or equivalent are considered within the scope of the present invention.

As illustrated in FIG. 1, the upright support structure 30 is supported by the base 20 and may extend upwardly from the base 20 to support the spindle engaging post 50. The upright support structure 30 may be any construction that can support the spindle engaging post 50 in the proper manner. In the present embodiment, the upright support structure 30 is a tubular post that has a bottom end 32, a top end 34, a bottom limb 35, a top limb 36, and an upright limb 37. The bottom limb 35 and the top limb 36 of this embodiment are generally parallel to the surface, and the upright limb 37 is generally perpendicular thereto. For purposes of this application, the term "generally" is defined to include a general disposition in certain dimensions, and not strictly limited to geometric parameters. Variation such as would be expected by one skilled in the art, typically +/−20 degrees, should also be expected.

While the upright support structure 30 may be constructed as illustrated, in alternative embodiments, other constructions may be utilized. For example, in one alternative embodiment, a simple upright tube connected to the base 20 may be used, or any other shape that may be devised by one skilled in the art for providing upright support to the bicycle 12 when mounted.

As illustrated in FIG. 1, the upright support structure 30 has a height H, which determines the height of the spindle engaging post 50. In one embodiment, the height H is between 12-22 inches. In alternative embodiments, the height H may also be varied with an adjustable feature (e.g., telescoping elements, or other constructions known to one skilled in the art) to allow for the support of differing heights of bicycles 12. In this embodiment, however, the upright support structure 30 is of fixed height. Two different products may be provided for use with different bicycles, in which case the height H may approximately or slightly more than either 12.5 inches, or 15 inches (15" for mountain bikes, or 12.5" for road bikes), although other heights may be selected if desired. For purposes of this application, the term "approximately or slightly more than" is defined to include a height that is suitable for supporting a bicycle of the stated height on the ground, or slightly higher so that one of the wheels of the bicycle is supported slightly off the ground, but not high enough to cause instability. In one embodiment, this may be an additional 1-3 inches.

In the present embodiment, the bottom end 32 is one end of the bottom limb 35 and may be connected to the base 20 at the connection point 22 of the base 20. The bottom end 32 may be generally "fish-mouthed"-shaped to engage the round shape of the base 20. Once engaged, the bottom end 32 may be affixed to the base 20 at the connection point 22 by welding, adhesives, pins, locking mechanisms, slots/grooves, etc. according to one skilled in the art.

In the present embodiment, the bottom limb 35 may be generally parallel to the surface, on the same horizontal plane as the base 20, to provide additional stability to the bicycle stand 10. The bottom limb 35 may be connected to the top limb 36 by the upright limb 37 to form a generally "U-shaped" upright support structure 30. Similar to the construction of the base 20, in the present embodiment, the connections between the bottom limb 35, the top limb 36, and the upright limb 37, are at approximately right angles, to form a generally "U-shaped" upright support structure 30. The angle and manner of connection of the bottom limb 35 and the top limb 36 to the upright limb 37 may be varied according to one skilled in the art.

Other embodiments may incorporate other combinations and configurations of limbs, for example, there may be no bottom limb 35 but instead two upright limbs connected to the base 20 to form a generally triangular shape, with the top limb 36 extending parallel to the surface and connected to the upright limbs at their apex.

The top end 34 of the upright support structure 30 is adapted for mounting the spindle engagement post 50. In this embodiment, the top end 34 may also include an adaptor sleeve 40 for receiving the spindle engaging post 50. The adaptor sleeve 40 may be of tubular construction with an inner aperture 46 and an outer surface. The adaptor sleeve 40 may be inserted into the top end 34 of the upright support structure 30, or otherwise operably mounted thereupon. The outer surface of the adaptor sleeve 40 may be frictionally engaged with the top end 34, as illustrated; or alternative, it may be threadedly engaged, welded, bonded, or attached in any other method known to one skilled in the art. The spindle engaging post 50 may then be inserted into the inner aperture 46 of the adaptor sleeve 40. The spindle engaging post 50 may be retained in the adaptor sleeve 40 also by frictional engagement, threading, adhesives, or any other method known to one skilled in the art. In this manner, the adaptor sleeve 40 may be selected to provide an inner aperture 46 that is suitable for receiving different sizes of the spindle engaging post 50. The adaptor sleeve 40 is discussed in greater detail in the discussion of FIG. 3, below.

While FIG. 1 illustrates one embodiment of how the spindle engaging post 50 may be mounted on the upright support structure 30, those skilled in the art may devise alternative embodiments of how to make the attachment, and any alternative or equivalent constructions or methods are considered within the scope of the present invention.

The spindle engaging post 50 may include a first end 52 that is adapted to be attached to the top end 34 of the upright support structure 30, and a second end 54 that is adapted to engage the spindle 16 of the bicycle 12. The second end 54 has an outer diameter D2 that may be sized and shaped to engage the spindle 16 of the bicycle 12, or D2 may be smaller than the spindle 16. In one embodiment, the spindle engaging post 50 may be a rod, or tubular in construction (e.g., cylindrical). In one embodiment the spindle engaging post 50 (and the first end 52 and the second end 54) may have an outer diameter D2 of ⅜ ¾ inch, though in other embodiments other diameters may be used.

The spindle engaging post 50 may be connected to the upright support structure 30 in any number of ways according to the knowledge of one skilled in the art. In the present embodiment, the first end 52 of the spindle engaging post 50 may be inserted into the adaptor sleeve 40 present in the upright support structure 30. In another embodiment, the spindle engaging post 50 may be inserted directly into the top end 34 of the upright support structure 30, or is welded, bonded, or otherwise attached thereto. With the spindle engaging post 50 mounted in the upright support structure 30 or the adaptor sleeve 40, the bicycle 12 may be moved such that the spindle 16, with an inner diameter D1, may slide over the spindle engaging post 50, with the outer diameter D2, holding the bicycle 12 in an upright position. While FIG. 1 illustrates one embodiment of the spindle engaging post 50, those skilled in the art may devise alternative embodiments, and these alternative or equivalent are considered within the scope of the present invention.

Figure 2:
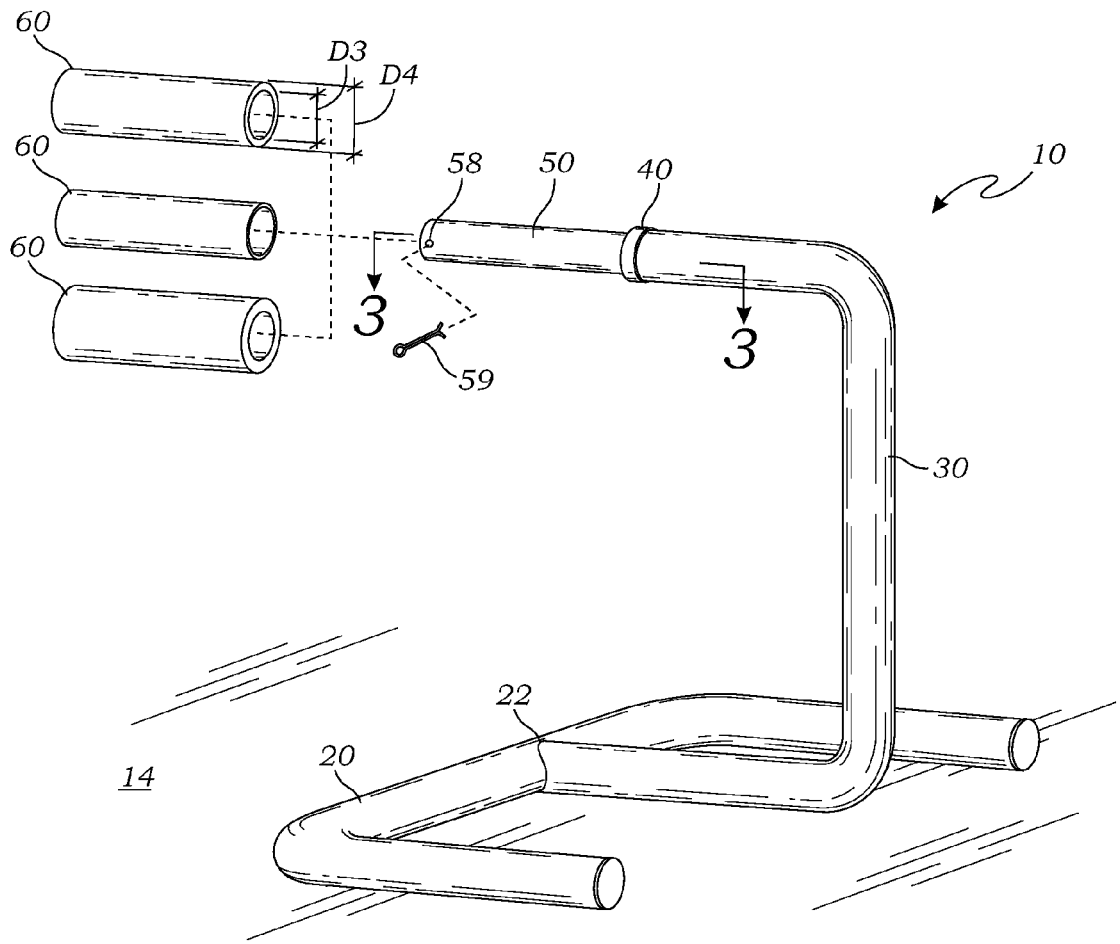
FIG. 2 is an exploded perspective view of the bicycle stand, illustrating outer sleeves of varying sizes that may be placed on the spindle engaging post for adapting the bicycle stand for use with different bicycles.

FIG. 2 is an exploded perspective view of the bicycle stand 10, illustrating outer sleeves 60 of varying sizes that may be placed on the spindle engaging post 50 for adapting the bicycle stand 10 for use with different bicycles (i.e., bicycles with spindles 16, shown in FIG. 1, of different diameters). The outer sleeve 60 may be a tubular structure having an inner diameter D3 and an outer diameter D4, and may be made of any suitable material; in this embodiment, it is made of plastic, rubber, or other surface that wears well against the bicycle, and preferably minimizes scratching or inadvertent damage to the bicycle. The inner diameter D3 of the outer sleeve 60 may be consistent with (i.e., slightly larger than) mounting over the outer diameter D2 of the spindle engaging post 50. The outer diameter D4 of the outer sleeve 60 may be varied according to those skilled in the art to be accepted by the inner diameter D1 of the spindle 16 of the bicycle 12, which typically have diameters that vary according to model or design. For example, one may use an outer sleeve 60 with a larger outer diameter D4 if the inner diameter D1 of the spindle 16 is larger, so that the bicycle 12 will stay on the bike stand 10 and not lean or slide off as easily.

The spindle engaging post 50 may further include a locking mechanism 58 for locking the outer sleeve 60 onto the spindle engaging post 50. In one embodiment, the locking mechanism 58 includes a hole radially through the spindle engaging post 50 at the second end 54, and a cotter pin 59. The protruding sections of the cotter pin 59 are bent back around the outer diameter of the spindle engaging post 50, so that the cotter pin 59 secures the outer sleeve 60 on the spindle engaging post 50 without obstructing the outer sleeve 60 over the spindle engaging post 50 from being inserted into the spindle 16. In other embodiments, the locking mechanism 58 may be a cap (not shown) that locks the outer sleeve 60 onto the spindle engaging post 50, or a screw or any other form of fastener; or alternatively, the outer sleeve 60 may threadedly engage an external thread (not shown) of the spindle engaging post 50. Those skilled in the art may devise alternative forms of the locking mechanism 58, and such alternatives should be considered within the scope of the present invention.

Figure 3:
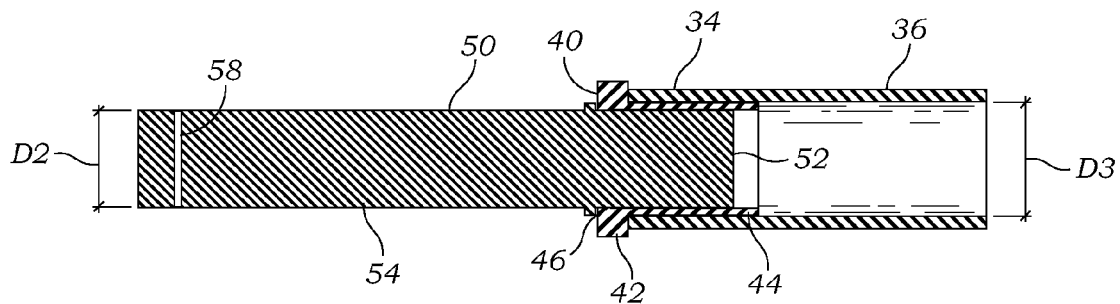
FIG. 3 is a sectional view taken along line 3-3 in FIG. 2, illustrating an adaptor sleeve inserted into the bicycle stand, and accepting the spindle engaging post.

FIG. 3 is a sectional view of the adaptor sleeve 40 inserted into the top limb 36, and accepting the spindle engaging post 50. The adaptor sleeve 40 allows the top limb 36 to accept differing outer diameters D2 of the spindle engaging posts 50. The adaptor sleeve 40 may have an outwardly extending flange 42 abutting the top end 36 of the upright support structure 30. There may also be an inner sleeve 44 shaped to be inserted into the top end 34 of the upright support structure 30, with the top end 34 having an inner diameter D3. It may be seen in FIG. 2, that the inner sleeve 44 may have an outer diameter such that it frictionally engages the top end 34 having an inner diameter D3.

Figure 4:
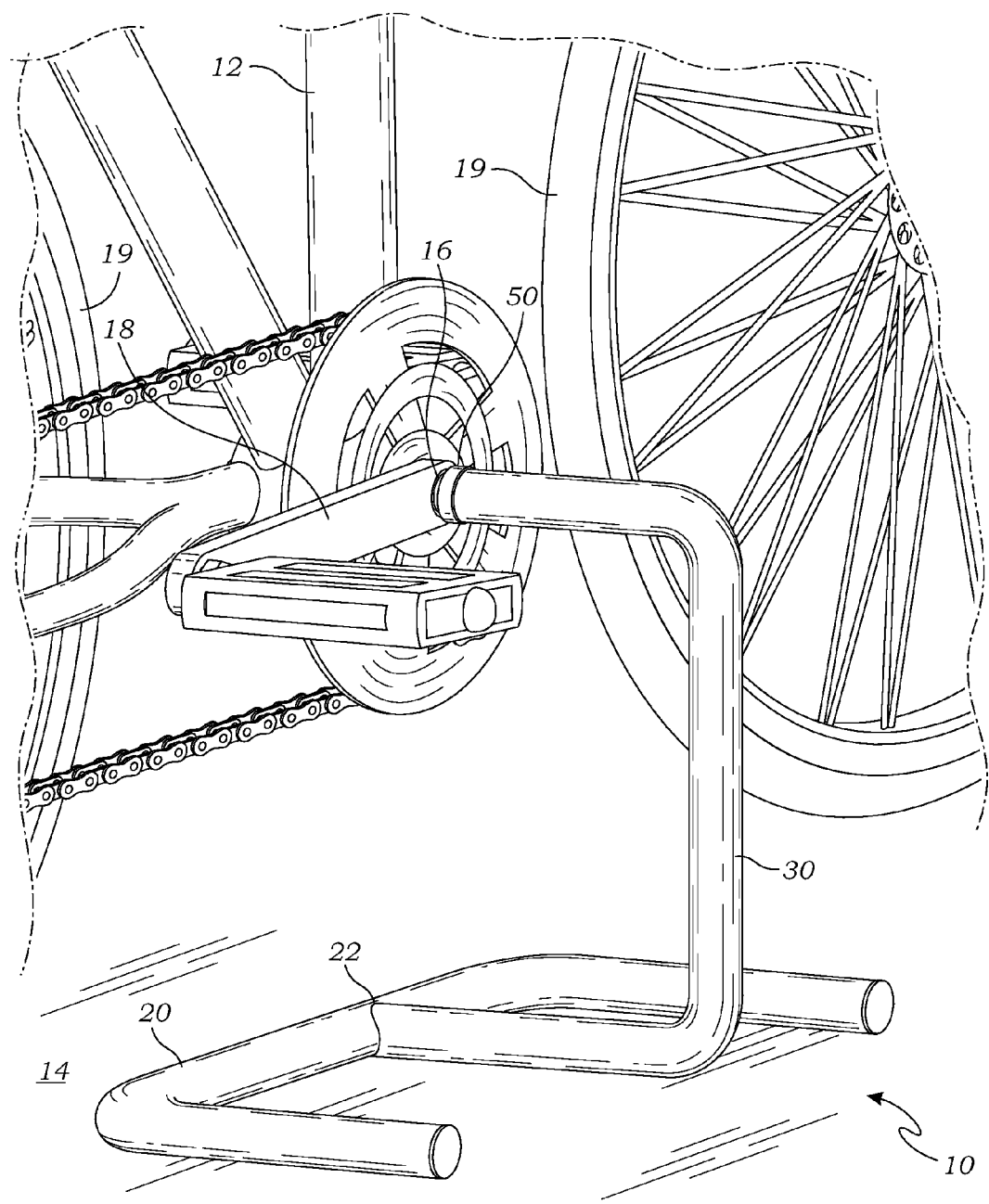
FIG. 4 is a perspective view of the bike stand, illustrating the bike stand supporting a bicycle in the upright position.

FIG. 4 is a perspective view of the bike stand 10, illustrating the bike stand 10 supporting a bicycle 12 in the upright position. The bicycle 12 is shown with one of the wheels 19, in this case the rear wheel, lifted off the surface 14. The spindle engaging post (not shown) is inside the spindle (not shown), supporting the bicycle 12 on the bike stand 10. Again, the base 20 and the upright support structure 30 are shaped such that the bicycle 12 will not tip over when held by the bike stand 10.

Figure 5:
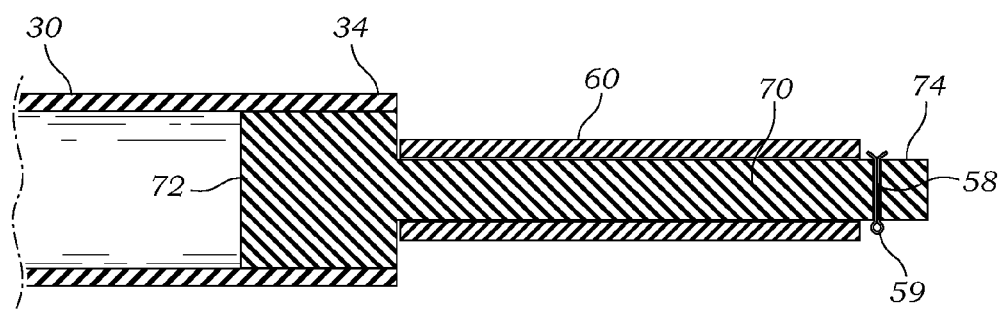
FIG. 5 is a sectional view of an alternative embodiment, illustrating a plug formed on the spindle engaging post and inserted into the bicycle stand.

FIG. 5 is a sectional view of an alternative embodiment of a spindle engaging post 70. In this embodiment, a first end 72 of the spindle engaging post 70 is shaped to directly engage the top end 34 of the upright support structure 30. A second end 74 includes the locking mechanism 58, in this embodiment the cotter pin 59. The first end 72 may be welded, glued, fastened, frictionally engaged, or otherwise joined with the top end 34. While FIG. 5 illustrates one embodiment, those skilled in the art may devise alternative embodiments, and these alternative or equivalent are considered within the scope of the present invention.

In the embodiment of FIGS. 1-5, the base 20 and the upright support structure 30 may be of rigid tubular construction, constructed of a strong and durable material such as steel, aluminum, or similar material. In alternative embodiments, however, this may not be required, and alternative embodiments that may be designed by those skilled in the art should be considered within the scope of the present invention.

The present invention may also include a method for supporting a bicycle 12 in an upright position on a surface 14 via a spindle 16 in the crank-arm 18 of the bicycle 12. The method may have the steps of, first, providing the bicycle stand 10 described above, or a similar structure that may be devised by one skilled in the art. Next, positioning the bicycle 12 adjacent the bicycle stand 10 such that the spindle engaging post 50 is above the surface 14. In one embodiment, the post 50 is between 12-22 inches above the surface 14, although any position that is equal to or exceeding the height of the spindle 16 of the bicycle 12 is acceptable. Next, lifting the bicycle 12 at least slightly above the surface 14. Finally, engaging the spindle engaging post 50 with the spindle 16 of the bicycle 12 so that the bicycle stand 10 supports the bicycle 12 in the upright position on the surface 14 with at least one wheel 19 of the bicycle 12 lifted off the surface 14, as shown in FIG. 4. Other steps for mounting the bicycle 12 on the bicycle stand 10 may be used by one skilled in the art. For example, if the bicycle stand 10 was adjustable in height, the step of adjusting the height H of the upright support structure 30 may be include.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A bicycle stand for supporting a bicycle in an upright position on a surface by engaging a spindle in a crank-arm of the bicycle, the bicycle stand comprising:
   a base for supporting the bicycle stand on the surface, the base comprising a first arm, a second arm, and a connecting arm, wherein the first arm and the second arm are parallel to each other, and the connecting arm is perpendicular to the first arm and the second arm, all disposed on a same horizontal plane of the surface, to form a generally U-shape;
   an upright support structure extending upwardly from the base to a top end, wherein the upright support structure comprises a bottom limb, a top limb, and an upright limb, wherein the bottom limb and the top limb are generally parallel to the surface, and the upright limb is generally perpendicular to the surface, to form a generally U-shape;
   wherein a bottom end of the bottom limb of the upright support structure is connected to a middle of the connecting arm of the base, so that the bottom limb is between the first and second arms on the horizontal plane, and such that the base supports the upright support structure; and a spindle engaging post that extends outwardly from the top end of the upright support structure for engaging the spindle of the bicycle so that the bicycle stand supports the bicycle in the upright position on the surface.

2. The bicycle stand of claim 1, further comprising an outer sleeve slidably mounted on the spindle engaging post, the outer sleeve having an outer diameter that is sized to fit within the spindle of the bicycle.

3. The bicycle stand of claim 2, further comprising a locking mechanism for locking the outer sleeve on the spindle engaging post.

4. The bicycle stand of claim 1, further comprising an adaptor sleeve inserted into the top end of the upright support structure for accepting the spindle engaging post.

5. The bicycle stand of claim 4, wherein the adaptor sleeve is of tubular construction and includes an inner aperture and an outwardly extending flange.

6. The bicycle stand of claim 1, wherein the spindle engaging post has a diameter of between ⅜-¾ inch.

7. The bicycle stand of claim 1, wherein the upright support structure has a height of between 12-22 inches.

8. The bicycle stand of claim 1, wherein the upright support structure has a height of approximately or slightly more than either 12.5 inches, or 15 inches.

9. The bicycle stand of claim 1, further comprising an outer sleeve placed on the spindle engaging post for adapting the bicycle stand for use with different bicycles, the outer sleeve having an outer diameter smaller than an inner diameter of the spindle, and wherein the spindle engaging post is cylindrical in shape and has a hole, collinear with a diameter of the spindle engaging post, extending completely through the spindle engaging post, wherein the hole is located at a position on the spindle engaging post so as not to be covered by the outer sleeve when the outer sleeve is abutting the top end of the upright support structure.

10. The bicycle stand of claim 1, wherein the base is shaped such that when the bicycle is mounted upon the spindle engaging post, that the center of gravity of the bicycle is within an area between a front wheel of the bicycle, a rear wheel of the bicycle, and a point that is on the base.

11. The bicycle stand of claim 1, wherein the spindle engaging post has a first end and a second end, and wherein the first end is shaped to be inserted into the top end of the upright support structure.

\* \* \* \* \*